(12) United States Patent
Petuchowski

(10) Patent No.: US 11,772,675 B2
(45) Date of Patent: Oct. 3, 2023

(54) ON-BOARD DETECTION AND LOGGING OF DRIVER SMARTPHONE USE

(71) Applicant: Samuel J. Petuchowski, Brookline, MA (US)

(72) Inventor: Samuel J. Petuchowski, Brookline, MA (US)

( * ) Notice: Subject to any disclaimer, the term of this patent is extended or adjusted under 35 U.S.C. 154(b) by 0 days.

(21) Appl. No.: 18/021,484

(22) PCT Filed: Aug. 5, 2022

(86) PCT No.: PCT/US2022/039563
§ 371 (c)(1),
(2) Date: Feb. 15, 2023

(87) PCT Pub. No.: WO2023/018617
PCT Pub. Date: Feb. 16, 2023

(65) Prior Publication Data
US 2023/0271623 A1   Aug. 31, 2023

Related U.S. Application Data

(60) Provisional application No. 63/260,229, filed on Aug. 12, 2021.

(51) Int. Cl.
*B60W 50/14* (2020.01)
*G01S 19/47* (2010.01)
*B60W 40/09* (2012.01)
*G07C 5/00* (2006.01)

(52) U.S. Cl.
CPC ............ *B60W 50/14* (2013.01); *B60W 40/09* (2013.01); *G01S 19/47* (2013.01); *G07C 5/00* (2013.01); *B60W 2050/143* (2013.01)

(58) Field of Classification Search
CPC ................. B60W 50/14; B60W 40/09; B60W 2050/143; G01S 19/47
See application file for complete search history.

(56) References Cited

U.S. PATENT DOCUMENTS

2018/0374111 A1   12/2018   Corry
2021/0260937 A1*  8/2021   Cyllik ................ B60C 23/0489

FOREIGN PATENT DOCUMENTS

CN   101918932   12/2010

OTHER PUBLICATIONS

Li et al., Determining driver phone use leveraging smartphone Sensors, in *Multimed Tools Appl.*, 23 pages, (Oct. 2015).
Wahlström, Sensor Fusion for Smartphone-based Vehicle Telematics, Doctoral Thesis, KTH Royal Institute of Technology, Stockholm Sweden (Dec. 2017)—Chap. 8.
Written Opinion of the ISA in PCT/US22/39563.

* cited by examiner

*Primary Examiner* — Nabil H Syed
*Assistant Examiner* — Cal J Eustaquio

(57) ABSTRACT

Methods and a computer application program for identifying manual use of a phone by the driver of a vehicle. The application collects heading, velocity and radial acceleration data already available to the operating system of all smart phones and uses the asymmetry of Coriolis acceleration with respect to right and left turns to detect manual phone usage by a driver. Detection may result in a visual and auditory warning that would incriminate the driver if the vehicle were to be stopped by law enforcement authorities or involved in an accident.

14 Claims, 3 Drawing Sheets

ON-BOARD DETECTION AND LOGGING OF DRIVER SMARTPHONE USE

The present application claims the priority of U.S. Provisional Patent Application, Ser. No. 63/260,229, filed 12 Aug. 2021, incorporated herein in its entirety by reference.

TECHNICAL FIELD OF THE INVENTION

The present invention pertains to methods for identifying manual use of a mobile phone by the driver of a vehicle and to a mobile phone that has been adapted to sense when it is being used by the driver of a vehicle.

BACKGROUND OF THE INVENTION

Whereas in the later decades of the $20^{th}$ century significant gains in traffic safety were still achieved through redesign of automobiles and highways, improvements in safety today require attention to the behavior and focus of drivers, at least until such a time as autonomous vehicle control becomes pervasive on the highways. To preclude driver distraction, the use of phones by drivers has been limited by various government authorities around the world to truly hands-free systems only, with loud-speakers or a headset and a fixed microphone installed in the vehicle. Disregard for his provision may have obvious disastrous consequences, imperiling the operator and others.

Government regulations proscribing inattentive driving, however, are difficult to enforce using current enforcement techniques. In particular, deficiencies of existing techniques have hindered both:
  a quantitative understanding of the extent to which driver distraction due to mobile device detracts from road safety in face; and
  effective enforcement mechanisms for existing regulations.

Thus, it is currently impossible to ascertain accurately what fraction of road accidents are attributable to driver distraction, while current modalities for mitigating driver distraction by real-time warning are similarly encumbered.

The desirability of identifying whether a communications device is being used in a driven vehicle by a driver or by a passenger was suggested by U.S. patent application Ser. No. 15/990,594 (hereinafter, "Corry"), entitled "Systems and Methods for Restricting Mobile Device Use," at par. [0037]. Corry provides no teaching, howsoever, as to how that identification might be accomplished. Corry teaches that mobile device usage, generally, might be determined based on car speed threshold values and mobile device usage data. Corry suggests no way to determine whether it is the driver, as distinct from a passenger, who is using the device. Since this is an essential determination, where safety and legal culpability are concerned, techniques of the presently claimed invention for actually determining driver use of a smartphone are taught in the following Description.

Estimating the placement of an operating smartphone within a moving vehicle on the basis of a machine learning framework has been addressed by Wahlström, "Sensor Fusion for Smartphone-based Vehicle Telematics," KTH Royal Institute of Technology (2017), (hereinafter, Wahlström), in Chapter 8. Wahlström teaches a statistical machine-learning method using kernel-based k-means clustering to identify screen state behavior statistics under variant empirical placements during a learning protocol. Rather than employing machine learning, a robust physically motivated method is taught in accordance with the presently claimed invention in the Description that follows.

Techniques for identifying smartphone positioning within a vehicle that are based on empirical sensor response statistics over segmented itinerary features are summarized by J. Wahlström, "Sensor Fusion for Smartphone-based Vehicle Telematics," Doctoral Theses, KTH Royal Institute of Technology, pp. 121-43 (2017). More robust data for purposes of enforcement, litigation, or insurance programs are desirable and are derived in accordance with the present invention taught herein.

SUMMARY OF THE INVENTION

Methods described herein address existing deficiencies by using a combination of capabilities that are already built into the hardware and operating systems of all smartphones. Embodiments of the present invention use external ("Earth-reference-frame-based") references (magnetometer and GPS) in combination with inertial measurements derived by the smartphone's own accelerometer(s)
  to discern that a device is being used manually by a driver;
  to obtain an evidentiary log attesting to the duration of such use, and, in the worst case, to the time of use relative to the time of an accident; and
  to warn the driver that such behavior has been detected and is illicit.

In accordance with preferred embodiments of the present invention, a method is provided for detecting manual use of a mobile phone by a driver of a vehicle. The method has steps of:
  a. receiving data associated with a contemporaneous heading a contemporaneous speed of the vehicle;
  b. deriving, based on said data, an incremental heading change, a sign associated with the incremental heading change that is one of positive or negative, and a nominal radial acceleration;
  c. receiving inertial accelerometer data from an accelerometer onboard the mobile phone;
  d. calculating, based at least on said inertial accelerometer data, and actual radial acceleration and an acceleration of the mobile phone; and
  e. determining manual use by the driver on the basis of at least the actual radial acceleration relative to the nominal radial acceleration.

In further methods in accordance with the present invention, the step of receiving data associated with a contemporaneous heading and speed of the vehicle may include receiving said data from at least one of a magnetometer and a GPS receiver disposed aboard the mobile phone. Other methods may also have a step of calculating a signed offset between the nominal radial acceleration and the actual radial acceleration, with the signed offset having a sign, positive or negative, associated with a sense of the incremental heading change. The offset may be an arithmetic difference of a ratio, or some other function involving the nominal radial acceleration and the actual inertial acceleration of the mobile phone.

In other methods in accordance with the present invention, there is also a step of accumulating the signed offset between the nominal radial acceleration and the actual radial acceleration at a plurality of instances thereby generating a net signed offset.

The step of determining manual use may be based upon a magnitude of the net signed offset, and, further, upon transverse walk data.

In yet further embodiments of the invention, there may be a further step of alerting the driver to a detected condition of manual use of the mobile phone, such as by generating an alarm. Additionally, the data associated with the contemporaneous heading and the contemporaneous speed of the vehicle may be logged.

In accordance with another aspect of the present invention, and improvement is provided to a mobile phone of the type having a magnetometer, a GPS receiver and an accelerometer and used to communicate via a network of cells. The improvement is adapted to detect usage of the mobile phone by the driver of a vehicle by virtue of loading thereon:
  a. program code for receiving data from the magnetometer, the data associated with a contemporaneous heading and form receiving a contemporaneous speed of the vehicle derived from GPS data;
  b. program code for deriving, based on said data, an incremental heading change, a sign associated with the incremental heading change that is one of left or right, and a nominal radial acceleration;
  c. program code for receiving inertial accelerometer data from the accelerometer;
  d. program rode for calculating, based at least on said inertial accelerometer data, an actual radial acceleration and acceleration of the mobile phone uncorrelated with vehicle motion;
  e. program code for calculating, based at least on said inertial accelerometer data, an actual radial acceleration of the mobile phone; and
  e. program code for determining manual use of the mobile phone on the basis of at least the actual radial acceleration of the mobile phone relative to the nominal radial acceleration.

In accordance with other embodiments of the present invention, there may be program code for calculating a signed offset between the nominal radial acceleration and the actual radial acceleration, the signed offset bearing the sign associated with the incremental heading change. There may, additionally, be program code for accumulating a signed offset between the nominal radial acceleration and the actual radial acceleration at a plurality of instants thereby generating a net signed offset. Further program code may generate an alarm upon determination of manual use of the mobile phone by the driver.

In accordance with other embodiments of the invention, the improvement may also have program code for logging the data associated with the contemporaneous heading and the contemporaneous speed of the vehicle.

DESCRIPTION OF THE FIGURES

The foregoing features of the invention with be more readily understood by reference to the following detailed description, taken with reference to the accompanying drawings, in which.

DESCRIPTION OF SPECIFIC EMBODIMENTS OF THE INVENTION

Figure 1:
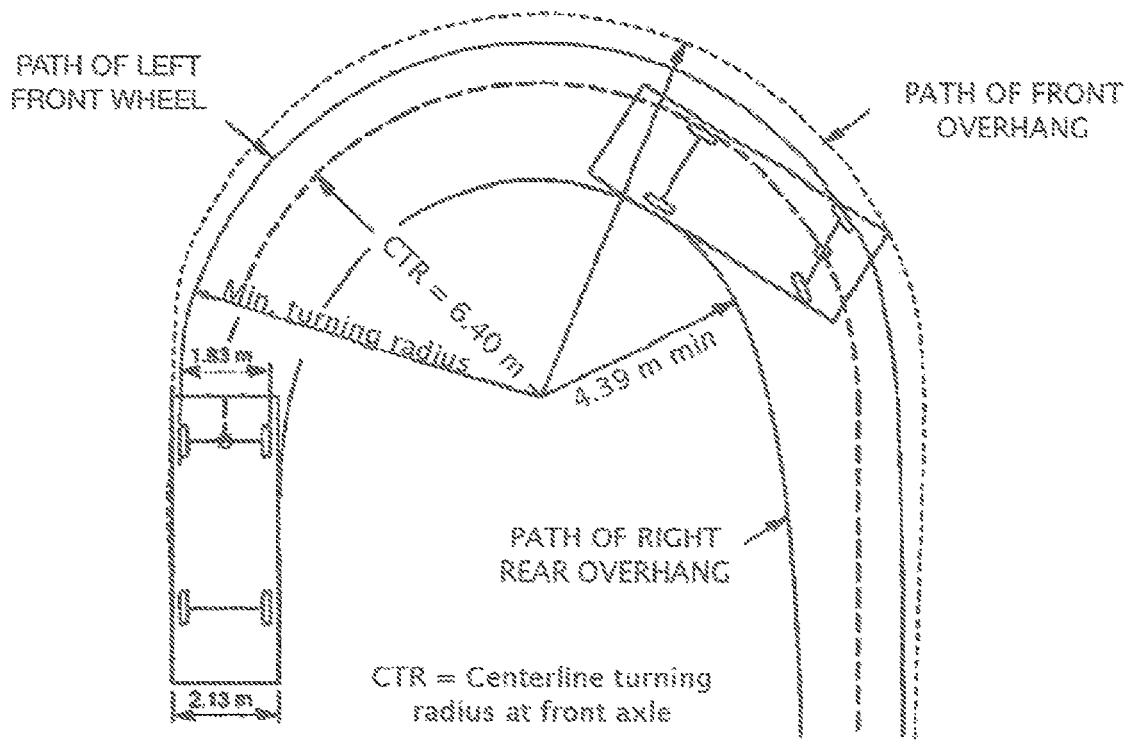
FIG. 1 depicts a minimum turning radius for a vehicle showing typical dimensions.

Adaptation of a mobile phone, in accordance with certain embodiments of the present invention, is accomplished by means of an computer application program executing methods like those described below, for example, with reference to FIG. 3, and referred to hereinafter as "the Application". The Application is preferably resident as a non-deletable application that is preinstalled on smartphones sold for use in particular jurisdictions and that cannot be disabled by the user. The mobile application registers any lapse of focus by the driver due to manual use of a smartphone.

For purposes of further description of emnodiments of the present invention, the following terms shall be subject to the meanings indicated below, unless otherwise dictated by context.

The term "contemporaneous." applied to a measured quantity, shall refer to data processed substantially concurrently with a measurement and typically during the course of continuing measurement.

The term "application," or, synonymously, "application program." refers to a set of steps, however implemented, causing a specific task to be executed on a computing or communications device.

An application is referred to as a "background application" on a particular device when it is not initiated by the user of the device and, typically, has no user interface other than, possibly, alerting the user to the existence of a state or condition.

The term "mobile phone" encompasses any device that may be carried by a person in any way that serves for both communication and computation. The term includes telephones of the type used to communicate via a network of cells, or via satellite, or otherwise.

A change in direction of travel of a vehicle may be assigned a "sign" that is positive for a direction to the right of an immediately preceding direction of the vehicle and negative to the left, or, conversely. Whether the turn is to the left or the right constitutes the "sense" of the heading change.

"Heading" denotes the direction of travel of a vehicle.

"Radial" acceleration refers to acceleration of a body, such as a vehicle, normal to the direction of a change in heading of the body.

An "inertial accelerometer" is an instrument that senses acceleration relative to an inertial frame of reference rather than deriving the acceleration from other measured quantities such as velocity, speed or direction relative to some external frame of reference. One or more physical sensors may provide the requisite acceleration data, referred to herein as an "actual acceleration," in contradistinction to a nominal acceleration derived by other means.

"Accumulating" data, as the term is used herein, refers to averaging an offset (a difference or a ratio) over time, with data acquired during successive turns of the vehicle weighted by the sign assigned to the sense (left or right) of each turn, if any.

An "alarm" denotes any mechanism for signaling to a user the existence of a condition or state.

A dot placed over a mathematical symbol denotes differentiation with respect to time. Two dots over a symbol denote two successive derivarives with respect to time.

In accordance with an embodiment of the present invention, the Application, described in detail in what follows, may run as a background application until such time as a speed exceeding a threshold of, say, 30 km/h is detected by the built-in GPS functionality. (Algorithms described below readily discriminate against motion by large vehicles like buses, trains, or planes, such that only motion in a passenger car or small truck will trigger functionality of the Application.) At that time, and without any voluntary action required on the part of the driver, the Application enters a LogActive mode acquiring and recording data from the smartphone's on-board sensors. In particular, the Application logs heading (relative to magnetic North) and velocity. The phone's orientation relative to the direction of motion is readily derived and any continuing differences between acceleration of the device relative to calculated acceleration based on vehicle motion are indicative of manual use of the device.

A mechanism is now described that identifies who is using the device in question. Is it the driver, or one of the passengers? That ambiguity has confounded existing systems based simply on detecting motion. That is where the Application comes into play. As stated, heading and velocity are logged on the basis of Earth-frame measurements, allowing a nominal Coriolis acceleration to be calculated and logged as well. Bear in mind that when a vehicle turns, the outer wheels (driver's side, for a right turn in the US or European Union) travel faster and further than the inner wheels. That's the purpose of a differential drive, for example. As described in detail below, the Application makes use of the asymmetry, between left- and right-turns, not in wheel speed but in radial acceleration as sensed by on-board inertial sensors of a smartphone in question. The Application additionally monitors the acceleration sensed by the three-axis accelerometers (of which a smartphone typically employs two sets for dynamic range and verification) and derives the component of acceleration transverse to both the direction of travel and the vertical. The discrepancy between calculated and measured radial acceleration is accumulated and compared between left- and right-turns. The effect is on the order of up to 10%. Since the driver is further from the center of curvature for turns toward the passenger's side (i.e., right in the US or European Union), the Application can detect and log manual use by the driver, in particular. (Type-I errors, i.e., false positives due to cellphone use by a passenger seated directly behind the driver, turn out to pose a minimal problem, at the level of only a few percent.

When the Application positively identifies manual phone use by the driver, the Application may replace the currently active phone screen with a Warning Screen and emits a Warning Alarm that is intended to prompt the user to put down the phone. If the warning is ignored, an enforcement officer stopping the vehicle (hopefully before any accident occurs) will be alerted to the circumstance with no intrusion into the user's data. That said, if the driver wishes to contest any charges, the driver may consent to having the data downloaded from the phone and analyzed or produced in court.

Thus, the Application detects manual cellphone use in a vehicle and identifies it as pertaining to the driver, and provides a log—a historical record—of pertinent motion of the vehicle and of the phone relative to the vehicle.

From the point of view of the driver of a vehicle, the mere existence and preinstalled aspect of the Application will naturally deter dangerous manual use of a phone while driving, even if the operation of the Application is latent in the background and invisible to the user unless the user is caught handling the phone while driving. The in-terrorem jeopardy of having ones illicit behavior detected and documented would seem to be the strongest argument in favor of adopting such a technology. It deters illegal behavior without requiring the intervention of law enforcement officials.

In the event that law enforcement officials suspect manual use of a phone by a particular driver and stop the vehicle for inspection, a Warning Screen and audio message provide prima facie evidence confirming their suspicion.

The minimum turning radius of a passenger vehicle is typically in the range of 7-8 m, corresponding to as tight a turn as a particular vehicle is capable. The geometry of such a turn is shown in FIG. 1, based upon a graphic published in the American Association of State Highway and Transportation Officials GreenBook. (The absence of any turns of radius of curvature smaller than a specified value provides evidences travel on a larger conveyance than an automobile, such as a bus, train, or airplane.) A bus, for example, cannot execute turns of radius of curvature less than about 13-14 m.

Figure 2:
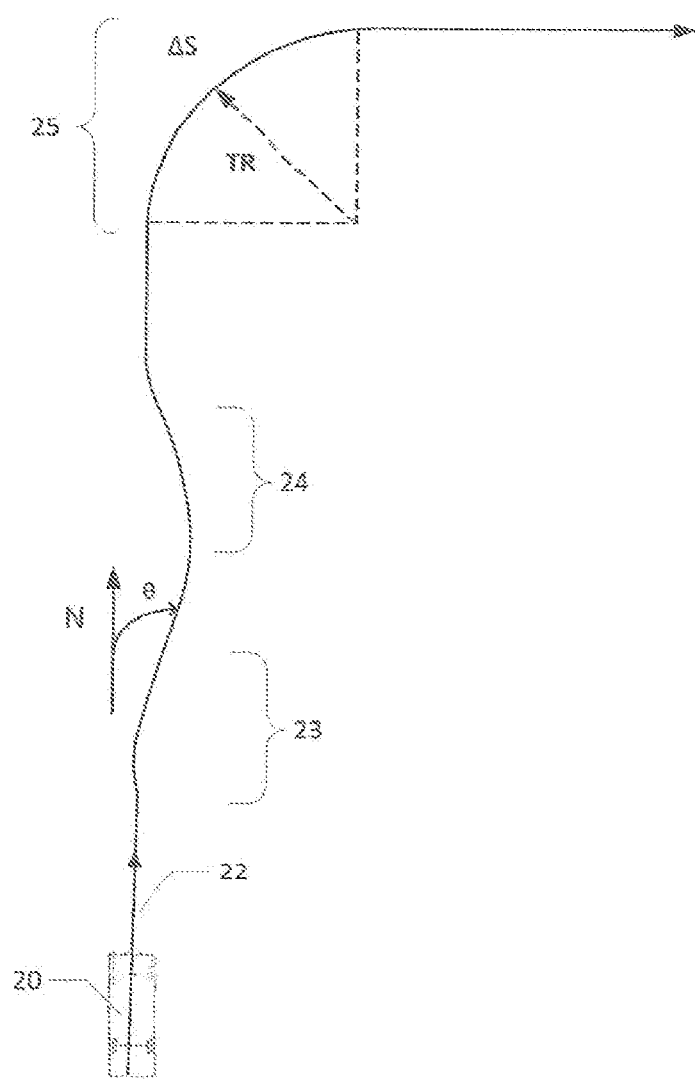
FIG. 2 is a schematic depiction of a course of travel of a vehicle.

Referring to the schematic shown in FIG. 2, as a vehicle 20 proceeds along a course of travel 22, it will experience changes in heading k, here derived by measuring excursions from magnetic North in units of radians, increasing clockwise. (The sign of changes in heading is specified arbitrarily within the Application, and both conventions, in that regard, are within the scope of the present invention as claimed.) Some turns are to the right 23, some turns are to the left 24. (Without loss of generality, and for heuristic convenience, it is assumed that the Application is being employed in the US or European Union and that the driver sits on the left. Thus, the driver sits on the outside of a right turn and the inside of a left turn.)

For purposes of the current document, the term "turn" encompasses any change $\Delta\theta$ of vehicle heading, whether resulting in a significant change in the direction of travel, or not. The discussion here employs an effective turn radius TR that is defined as now described. TR is only a proxy for the instantaneous geometrical radius of curvature of vehicle course 22, but is, instead, taken over a finite time rather than in the infinitesimal limit. In the course of an interval of time $\Delta t$ during a turn, the vehicle travels a distance $\Delta S=v\Delta t$, where v is the speed of the vehicle. A the heading has shifted $\Delta\theta$ in that interval, the effective taro radius $$TR = \frac{\Delta S}{\Delta \theta}.$$

A typical turn is now considered, in order to provide the reader with an idea of the magnitudes involved. Referring, again, to FIG. 2, it is assumed, for example, that vehicle 20 executes a 90° turn 25 in 5 s, traveling at 40 km/h. If the turn rate $$\dot{\theta} = \frac{d\theta}{dt} = \frac{\pi/2}{\theta} = \frac{\pi}{10} \text{rad}/s$$

is constant throughout the turn, the distance traveled during the 5-second turn is 55 m. The effective turn radius is thus TR=35 m. At an urban street corner, with a comparable 90° turn taken at 10 km/h over 5 s, TR=8.75 m.

As the vehicle 20 turns, the radial acceleration $\alpha_g$ contains a term proportional to $\bar{0}$, assumed zero, and a term referred to as the Coriolis term, $\sim 2v\dot{\theta}$. The vehicle speed v is available on a smart phone, as the variable speed in the Core Location Framework of iOS, on an iPhone™, for example. The Application obtains the vehicle speed v from the onboard GPS measurement and the turn rate $\dot{\theta}$ from time differentiation of the phone's magnetometer heading, and calculates a nominal radial acceleration designated $\alpha_g^{\oplus}$. The symbol $\oplus$ denotes Earth, as the calculated radial acceleration is Earth-frame-based. Both heading and speed are coarse measures of the motion of vehicle 20 and limited by GPS resolution. The radial acceleration calculated in the aforesaid manner is referred to herein as the "nominal radial acceleration" of the vehicle.

In order to continue developing a sense of the magnitude of the effect used by the Application to detect manual phone usage by a driver, the Earth-frame-based radial acceleration in the above example of a vehicle turning at 40 km/h, is calculated as $\alpha_g^\oplus \approx 2\times(1.1 \text{ m/s})(v/10 \text{ rad/s}) \approx 6.98 \text{ m/s}^2 \approx 0.71$ g, where g is the gravitational acceleration at the Earth's surface.

Now, a smart phone also contains within it the capability of actually measuring acceleration in the frame of the phone returning the vector ($\alpha_x$, $\alpha_y$, $\alpha_z$) indexed in the frame of the phone. The component of that acceleration vector transverse to the direction of motion, and thus radial outward with respect to any turn, can be calculated every time the accelerometer is read, since the orientation of the phone is known on the basis of gravity vector and magnetometer North, and is simply called by the Application as a vector (CMAcceleration in the Core Motion Framework in iOS). (Note: the iPhone™, and smart phones generally, have two sets of accelerometers, referred to herein generally as "the accelerometer.") Thus, the radial acceleration that is measured, $\alpha_\theta^i$, may be compared continuously and logged as a ratio with respect to the nominally calculated $\alpha_g^\oplus$. A concomitant advantage of the Application is that, insofar as acceleration is logged, a timestamp is available with respect to any collision.

On average, the ratio $$\frac{a_\theta^i}{a_\theta^\oplus}$$

remains approximately equal to 1, when suitably smoothed. But, to the extent to which it is larger during periods of vehicle motion when $\dot\theta>0$ (turning right) than during periods when $\dot\theta<0$, confidence increases that the phone and its accelerometer are on the left (i.e., driver's side) of the centerline of the vehicle. We can estimate the magnitude of this effect. On a right turn, the phone in the driver's hand is ~ ½ m more distant from the center of curvature of the turn than the nominal center line of the vehicle, whereas it is ~½ m closer to the center of curvature on a left turn. Thus, the magnitude of the telltale effect is about 1 m out of a typical turning radius of, say, 10 m, or, on the order of 10%. The excursion from 1 (or "unity") of the ratio of $$\frac{a_\theta^i}{a_\theta^\oplus}$$

is referred to herein as an "offset." Of course, for computational convenience, the difference between the two values, $\alpha_\theta^i$ and $\alpha_g^\oplus$, may be tracked instead, and, similarly, accumulated over intervals of time to reduce noise. Either computational scheme is within the scope of the present invention, as are the accumulation and tracking of other functions of $\alpha_\theta^i$ and $\alpha_g^\oplus$.

In the example above, it was determined that of $\alpha_0^\oplus \approx 0.7$ g. so a left/right asymmetry on the order of 10% of that value is being sought, or somewhat less than 0.1 g. For scale, the specified sensitivity of the built-in MPU-6500 accelerometer on an iPhone is 16884 LSB/g, as specified in https://invensense.tdk.com/products/motion-tracking/6-axis/mpu-6500. That is to say that the sought-after effect of cellphone position within the vehicle is on the order of 1500 times the least significant bit returned from an accelerometer measurement. While there will be statistical noise, a clear detection of cellphone position is to be expected after a moderate duration of driving. The continuously updating measure of $$\frac{a_\theta^i}{a_\theta^\oplus},$$

separately averaged for right and left turns, can be compared with the standard deviation to establish meaningful statistics. The degree of local acceleration of the phone in the plane transverse to the direction of motion (referred to herein as "transverse walk" data) provides further evidence that the phone was being handled during the course of vehicle motion.

Embodiments of the invention are based upon the recognition that the actually measured acceleration transverse to the direction of car travel and perpendicular to gravity is sensitive to where, within a turning vehicle, the acceleration is measured with respect to the right/let sense of the turn. This is believed to be a novel application of a known principle that can save lives on the roads. For an example from another realm entirely, an expert marksman is said to be able to determine location in the northern or southern hemisphere by observing whether the bullet is pulled to the left or the right of the mark due to an analogous effect.

The left/right determination of phone position is made on the basis of accumulating and analyzing GPS, magnetometer and accelerometer data provided as parameters by calls to standard 'methods' (in the sense of object-oriented programming) of smart phone operating systems. Once it is established to a specified degree of certainty that the driver is handling a phone, the driver's attention is drawn by the phone flashing an Warning Screen and sounding an alert message to the effect that manual device use is illegal. "Please stop the car if you wish to use the phone." might be an appropriate alert. If the driver then stows the phone, that would be indicated in the logged data on the app. This modality serves to keep the driver's focus on the road ahead, but also to register a log of any phone use that might cause lapses of attention. Should a collision occur, first responder would encounter a phone with a live screen in an alert mode. Observation of the Warning Screen might serve as prima facie evidence for administrative offense procedures, although administrative rule-making or legislation might be required in that regard. The prima facie evidence could be rebutted if the phone's owner consents, perhaps on, the advice of counsel, to provide logged data registered on the phone.

The circumstance, under which a mobile phone adapted with the Application gives rise to a false positive is when a mobile phone device is used by a passenger seated directly behind the driver. That circumstance is poorly recognized by the protocol described above. To estimate the frequency of such a circumstance, assume that a fraction, f, of cars on the road with a single driver additionally carry a single passenger. For purposes of estimation, assume that the same fraction f of one-passenger cars carry Iwo passengers, and so on, such that the fraction of vehicles decreases exponentially with the number of passengers. The average number of persons in passenger vehicles in the United States (based on 2017 data) is 1.59. Solving for the fraction f that yields that average, $$\frac{1+2f+3f^2+4f^3}{1+f+f^2+f^3} = 1.59,$$

one obtains f=0.346, indicating that 66.4% of passenger vehicles carry only the driver, and that 4 passenger—the only circumstance typically giving rise to a passenger seated directly behind the driver—are present in only 2.74% of cases, unless, perhaps the car serves as a taxi.

Figure 3:
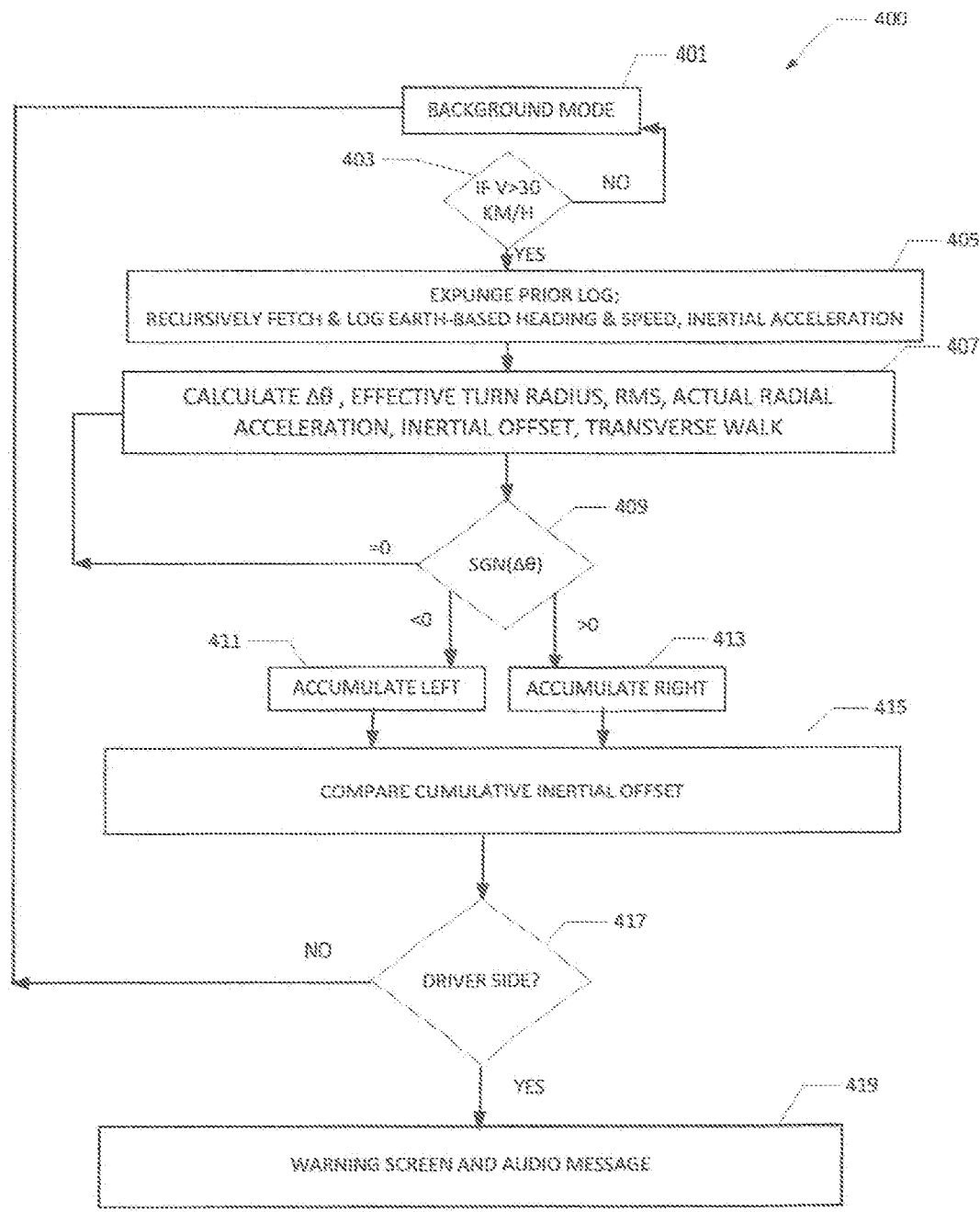
FIG. 3 is a flowchart depicting steps in accordance with embodiments of the present invention for determining whether a mobile phone is being used by the driver of a vehicle.

Referring to FIG. 3, a method for detecting driver cellphone use is described as designated generally by numeral 400 using the steps of the Application.

In the embodiment depicted in FIG. 3, the Application resides in a dormant Background Mode 401 until a velocity exceeding a threshold, such as 30 km/h, is detected 403. At that point, data are fetched from respective GPS, magnetometer and accelerometer hardware onboard the phone 405. This requires, in iOS, for example, a call to startDeviceMotionUpdates, where the rate of recurrent sampling is specified. The update rate is typically limited by hardware to about 100 s$^{-1}$, but, subject to physical limitations, may be programmed to optimize signal-to-noise, if vehicular travel is detected, the Application expunges any previously saved data and, in step 407 begins to collect and save measurement's pertinent to the speed and heading of the car as well as accelerometer data indicating acceleration sensed by the on-board gyroscope(s). The user may be given the option to retain, and even to upload, previously collected data, if it is germane for any personal purpose. It is here that a timestamp is provided of any collision, relative to which driver focus can be analyzed as a factor contributing to the collision.

During successive cycles of data collection, though not necessarily synchronously, a number of derivative values are calculated, in step 407, including changes in heading, and the rate of heading change, an effective turn radius, the projection of acceleration onto the plane transverse to the direction of car motion. At this stage, if no turn is detected with an effective turn radius below a specified cutoff, it can be assumed that the vehicle is a large conveyance, such as a bus or train or plane, and the program can be reset, accordingly. Data with respect to transverse acceleration uncorrelated with vehicle motion, herein referred to as Transverse Walk, indicates that the orientation of the phone is changing relative to the car, i.e., that the phone is in manual use.

The Application keeps track of the statistics of acceleration in the plane transverse to car motion, which is indicative of the phone being held manually. The inertial offset is calculated, referring to the discrepancy between a calculated Coriolis acceleration and the value of radial acceleration actually measured. Since the data based on Earth-frame-referenced measurements (speed, heading) are derived from a predictive filter (such as a Kalman filter) embedded in the phone's operating system, it will generally reflect the overall course of the vehicle, smoothed to some degree. By contrast, the inertial accelerometer data reflect where the phone is situated relative to the center of curvature of a given turn.

By binning the data, in step 409, according to whether the vehicle is changing course to the right or left at the present instant, the inertial offset is accumulated and averaged along with data similarly corresponding either to left 411 or right 413 turns. A comparison, in step 415, determines whether the phone is situated right or left of the vehicle centerline, and, by incorporating the rms of the accumulated measurements, a degree of confidence may be calculated. Based on a threshold confidence level determined during testing, driver use is declared 417 and the phone goes into a Warning Mode, with both visual and Audio cues 419 issued to the driver and an admonition to cease manual use of the phone. After some period of time, the program reverts to its original state.

The present invention may be embodied in any number of instrument modalities. In particular, the information derived from other techniques may be used to complement the data derived as taught above. In alternative embodiments, the disclosed methods for detecting and logging smartphone use by a driver may be implemented as a computer program product for use with a computer system. Such implementations may include a series of computer instructions fixed on a tangible medium, such as a computer rendable medium (e.g., a diskette. CD-ROM, ROM, or fixed disk). The series of computer instructions embodies all or part of the functionality previously described herein with respect to the system. Those skilled in the at should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product). These and other variations and modifications are within the scope of the present invention as defined in any appended claims.

What is claimed is:

1. A method for detecting manual use of a mobile phone by a driver of a vehicle, the method comprising:
   a. receiving contemporaneous heading data and contemporaneous speed data associated with a contemporaneous heading and a contemporaneous speed of the vehicle;
   b. deriving, based on the contemporaneous heading data and the contemporaneous speed data, to the exclusion of any accelerometer data, an incremental heading change, a sign associated with the incremental heading change that is one of positive or negative, and a nominal radial acceleration;
   c. receiving inertial accelerometer data from an accelerometer onboard the mobile phone;
   d. calculating, based at least on said inertial accelerometer data, an actual radial acceleration of the mobile phone;
   e. calculating a signed offset between the nominal radial acceleration and the actual radial acceleration, the signed offset bearing the sign associated with a sense of the incremental heading change; and
   f. determining manual use by the driver as distinct from any passenger on the basis of
      at least the signed offset between the actual radial acceleration of the mobile phone relative to the nominal radial acceleration.

2. A method in accordance with claim 1, wherein receiving the data associated with the contemporaneous heading and the contemporaneous speed of the vehicle includes receiving said data from at least one of a magnetometer and a GPS receiver disposed aboard the mobile phone.

3. A method in accordance with claim 1, wherein the signed offset is the arithmetic difference between the nominal radial acceleration and the actual radial acceleration.

4. A method in accordance with claim 1, wherein the signed offset is a ratio of the nominal radial acceleration and the actual radial acceleration.

5. A method in accordance with claim 1, further comprising accumulating by averaging the signed offset between the nominal radial acceleration and the actual radial acceleration at a plurality of instants thereby generating a net signed offset.

6. A method in accordance with claim 1, wherein the step of determining manual use as distinct from any passenger is based upon a magnitude of the net signed offset.

7. A method in accordance with claim 1, wherein the step of determining manual use as distinct from any passenger is further based upon transverse walk data.

8. A method in accordance with claim 1, further comprising alerting the driver to a detected condition of manual use of the mobile phone.

9. A method in accordance with claim 6, wherein alerting the driver includes generating an alarm.

10. A method in accordance with claim 1, further comprising logging the data associated with the contemporaneous heading and the contemporaneous speed of the vehicle.

11. An improvement to a mobile phone having a magnetometer, a GPS receiver and an accelerometer, the improvement adapted to detect usage of the mobile phone by a driver of a vehicle by virtue of loading thereon:
   a. program code for receiving contemporaneous heading and contemporaneous speed data associated with a contemporaneous heading and a contemporaneous speed of the vehicle;
   b. program code for deriving, based solely on said contemporaneous heading and contemporaneous speed data, an incremental heading change, a sign associated with the incremental heading change that is one of positive or negative, and a nominal radial acceleration;
   c. program code for receiving inertial accelerometer data from an accelerometer onboard the mobile phone;
   d. program code for calculating, based at least on said inertial accelerometer data, an actual radial acceleration of the mobile phone;
   e. program code for accumulating by averaging a signed offset between the nominal radial acceleration and the actual radial acceleration at a plurality of instants thereby generating a net signed offset; and
   f. program code for determining manual use by the driver as distinct from any
      passenger on the basis of at least the signed offset between the actual radial acceleration of the mobile phone relative to the nominal radial acceleration.

12. The improvement in accordance with claim 11, further comprising program code for calculating the signed offset between the nominal radial acceleration and the actual radial acceleration, the signed offset bearing the sign associated with the incremental heading change.

13. The improvement in accordance with claim 11, further comprising program code for generating an alarm upon determination of manual use of the mobile phone by the driver.

14. The improvement in accordance with claim 11, further comprising program coded for logging the data associated with the contemporaneous heading and the contemporaneous speed of the vehicle.

* * * * *